United States Patent
Hayakawa (10) Patent No.: US 7,091,826 B2
(45) Date of Patent: Aug. 15, 2006

(54) USER AUTHENTICATION SYSTEM USING BIOMETRIC INFORMATION

(75) Inventor: Shoji Hayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 339 days.

(21) Appl. No.: 09/948,790

(22) Filed: Sep. 10, 2001

(65) Prior Publication Data

US 2002/0130764 A1    Sep. 19, 2002

(30) Foreign Application Priority Data

Mar. 14, 2001  (JP) .............................. 2001-072304

(51) Int. Cl.
*H04Q 1/00* (2006.01)
(52) U.S. Cl. .................... 340/5.82; 340/5.21; 340/5.52
(58) Field of Classification Search ............. 707/104.1; 713/200, 184; 340/5.82, 5.52, 5.53
See application file for complete search history.

(56) References Cited

U.S. PATENT DOCUMENTS 5,367,572 A * 11/1994 Weiss ......................... 713/184
5,930,804 A * 7/1999 Yu et al. .................. 707/104.1

FOREIGN PATENT DOCUMENTS

| JP | 8-77269 | 3/1996 |
| JP | 10-105517 | 4/1998 |
| JP | 2000-132515 | 5/2000 |

* cited by examiner

*Primary Examiner*—Brian Zimmerman (74) *Attorney, Agent, or Firm*—Staas & Halsey LLP (57) ABSTRACT

In a biometric information registration phase, an authentication server previously obtains user information and biometric information, and registers them in a user information management part and a biometric information registration part. An authentication software transmission part associates the authentication software in an authentication software management part with the biometric information so that the software is uniquely specified, and sends it to a user terminal of interest. Thus, the user terminal, the authentication software, and the biometric information are uniquely associated with each other. In a user authentication phase, biometric information sent from the user terminal 3 using the authentication software is compared with the registered biometric information to conduct user authentication.

10 Claims, 9 Drawing Sheets

| Registrant ID | Feature parameter | Number of dimensions of feature parameter | Coefficient of high-pass filter |
|---|---|---|---|
| 001 | LPC cepstrum | 28 | 1.0 |
| 002 | MFCC | 27 | 0.98 |
| 003 | MFCC | 28 | 1.0 |
| .... | .... | .... | .... |

USER AUTHENTICATION SYSTEM USING BIOMETRIC INFORMATION

BACKGROUND OF THE INVENTION

1. Field of the Invention

The present invention relates to a user authentication system for authenticating a user by using biometric information, and in particular to a user authentication system that accepts only access from a user having an access right to the system to authenticate the user.

2. Description of the Related Art

In recent years, due to the rapid proliferation of the Internet and mobile phones, there are increased chances that each terminal can utilize various services on a network. Some services provided on the network require user authentication. In the case of conducting electronic commercial transactions, checking the balance on an account, making a payment, etc., user authentication via the network is required. Most user terminals are equipped with microphones for a voice input, so that a user can be authenticated by using a voice. Furthermore, CCD cameras recently become standard equipment on user terminals due to a lowered price thereof. Therefore, a user can also be authenticated by using a face picture. Still furthermore, a user authentication system using other various kinds of biometric information is being developed.

In user authentication using biometric information, higher security is ensured compared with the case of using a personal identification number. However, conventional user authentication using a user terminal connected to an authentication server on the network has a problem of unauthorized access by "a person who pretends to be a user". For example, most user terminals are equipped with microphones that allow a voice input to be conducted, so that in the case of user authentication using a voice as biometric information, it is possible to access an authentication server through the network by using any user terminal equipped with a microphone and to try pretending to be a user by inputting a voice as biometric information. In this case, a certain level of security can be ensured since an input of a voice as biometric information is required. However, as described above, it is possible to try accessing a user authentication server from any terminal by using biometric information through the network.

Thus, in a user authentication system using biometric information, it is required to manage a user terminal that is permitted to access a user authentication system. It is also required to associate a user terminal, a user who is permitted to input biometric information from the user terminal, and the contents of the biometric information with each other.

SUMMARY OF THE INVENTION

Therefore, with the foregoing in mind, it is an object of the present invention to provide a user authentication system that ensures a high level of security, by administering a user terminal that is permitted to access a user authentication system, and associating a user terminal, a user who is permitted to input biometric information from the user terminal, and the contents of the biometric information with each other.

In order to solve the above-mentioned problem, a user authentication system of the present invention includes: a biometric information registration part for obtaining and registering user's biometric information; an authentication software transmission part for sending authentication software associated with the registered biometric information so as to be uniquely specified to the user terminal with respect to only a user who registers the biometric information in the biometric information registration part; and an authentication processing part for conducting user authentication upon receiving a request for user authentication by comparing user's biometric information sent from the user terminal using the authentication software with the biometric information associated with the authentication software and registered as that of the user in the biometric information registration part.

According to the above-mentioned configuration, authentication software associated with biometric information registered by a user so as to be uniquely specified is distributed to each user terminal. Therefore, it is possible to know which user terminal is accessing an authentication server using which authentication software. Furthermore, authentication software is associated with user's biometric information previously registered. User authentication is conducted only in the case where a user terminal, authentication software, and a user are all authorized. Thus, high security can be ensured. Compared with a conventional method only depending upon authenticity of biometric information under the condition that any user terminal can access an authentication server using any authentication software, higher security can be ensured. Furthermore, registered biometric information is managed, so that a registrant can be prevented from pretending to be another registrant.

In order to uniquely specify authentication software, in addition to association of authentication software with biometric information, an index is embedded in the authentication software. Alternatively, a user's personal ID is embedded in the authentication software. In the case where an index is embedded in authentication software, a user terminal ID is fixed, so that there is the following advantage. When there is unauthorized use of a user terminal due to the robbery and the like, access from authentication software provided with an index in the stolen user terminal can be rejected. Furthermore, in the case where a personal ID is embedded in the authentication software, a registrant who can access an authentication server by using the authentication software is limited. Therefore, a registrant is prevented from pretending to be another registrant, and a user is not required to input a personal ID when using the authentication software.

It is also possible to set a password in authentication software. According to this configuration, even in the case where authentication software is copied without proper authorization, or a terminal is stolen, the use of the authentication software can be prevented to some degree. In the case where a user desires to change a user terminal, authentication software becomes available by moving it.

It is preferable that algorithms for extracting biometric information of the authentication software are varied depending upon a user, whereby algorithms of the authentication software are allowed to have variations among user terminals.

According to the above-mentioned configuration, there are more than one kind of algorithms for extracting biometric information adopted by authentication software at a user terminal. Even in the case of unauthorized access, an unauthorized user does not know which algorithm is adopted by the authentication software. Therefore, security can be ensured.

It is preferable that one kind or a plurality of kinds of biometric information are selectively registered in the biometric information registration part, and the authentication software transmission part sends authentication software provided with extraction algorithms corresponding to the one kind or plurality of kinds of biometric information registered on a user basis to the user terminal.

Because of the above-mentioned configuration, the authentication software can allow a user to selectively input biometric information upon receiving a request for user authentication, thereby limiting access by an input of biometric information other than the registered biometric information. As a result, an unauthorized user does not know which biometric information should be input when accessing for user authentication, making it further difficult for an unauthorized user to pretend to be an authorized user.

If there are provided processing program codes of processing operations for realizing the user authentication system of the present invention, the user authentication system of the present invention can be configured with a computer by reading a processing program from a computer-readable recording medium storing the program.

These and other advantages of the present invention will become apparent to those skilled in the art upon reading and understanding the following detailed description with reference to the accompanying figures.

DESCRIPTION OF THE PREFERRED EMBODIMENTS

Embodiment 1

Figure 1:
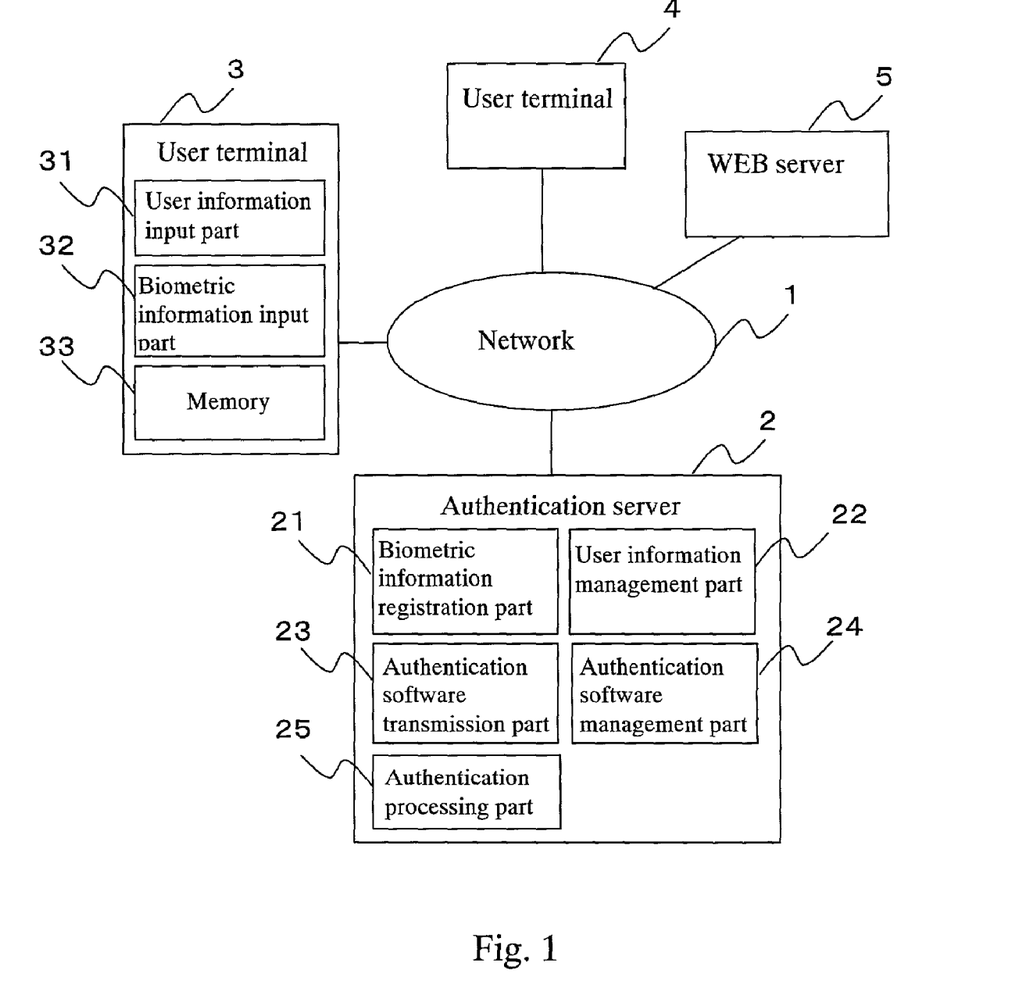
FIG. 1 illustrates an exemplary configuration of a user authentication system of Embodiment 1 according to the present invention.

FIG. 1 illustrates an exemplary configuration of a user authentication system of Embodiment 1 according to the present invention.

It is assumed that an authentication server 2, a user terminal 3 that has conducted user registration using biometric information, and a user terminal 4 that has not conducted user registration using biometric information are connected on a network 1. Furthermore, a WEB server 5 available to authenticated users is connected to the network 1. In order for a user to receive service on the WEB server 5 by using a browser of the user terminal 3, the user is required to register biometric information in the authentication server 2 to obtain user authentication.

The authentication server 2 includes a biometric information registration part 21, a user information management part 22, an authentication software transmission part 23, an authentication software management part 24, and an authentication processing part 25. Communication interfaces on the network and the other devices equipped in computers are not shown in FIG. 1.

The biometric information registration part 21 has a user model creating function for obtaining biometric information of a user and creating a user model based on the biometric information. The biometric information may be peculiar to a living body of a user and may be used for uniquely identifying an individual. Examples of the biometric information include natural voice data of a user, a fingerprint image, a face picture, an iris image, and the like.

The biometric information registration part 21 stores and manages user models of biometric information on the user basis. The biometric information registration part 21 also stores and manages information on association between the authentication software sent to the user terminal 3 and the biometric information obtained by the authentication software, as described later.

The user information management part 22 obtains and manages various kinds of user information required for user authentication from a user. There is no particular limit to the user information. The user information may contain at least user's biometric information and an ID for identifying an individual. Furthermore, in accordance with management, various kinds of information can be assumed, which are required in an application. Examples of such user information include user's personal ID information, access authority, and credit information.

The authentication software transmission part 23 controls the transmission of authentication software to a user terminal. Authentication software stored in the authentication software management part 24 is taken out, and is associated with biometric information of a target user so as to be uniquely specified.

The authentication software management part 24 manages and registers authentication software. For example, the authentication software management part 24 has authentication software corresponding to the extraction algorithm of biometric information.

The authentication processing part 25 authenticates a user in accordance with a request for user authentication from a user.

The user terminal 3 includes a user information input part 31, a biometric information input part 32, and a memory 33. Communication interfaces on the network and the other devices equipped in computers are not shown in FIG. 1.

The user information input part 31 is used for inputting various kinds of user information, such as user's personal ID information, an access authority, and credit information, in accordance with the management of an application which the user attempts to use. There is no particular limit to an input apparatus portion. A touch panel input apparatus, a keyboard, a pointing device such as a mouse, a file input apparatus, and the like can be assumed.

The biometric information input part 32 is used for inputting biometric information of a user used in user authentication. An input apparatus portion is varied in accordance with the biometric information to be inputted. When the biometric information is natural voice data, a microphone apparatus may be used. When the biometric information is a fingerprint image, a fingerprint reading apparatus may be used. When the biometric information is a face picture or an iris image, a camera may be used.

The memory 33 receives authentication software sent from the authentication server 2 and stores it.

Figure 2:
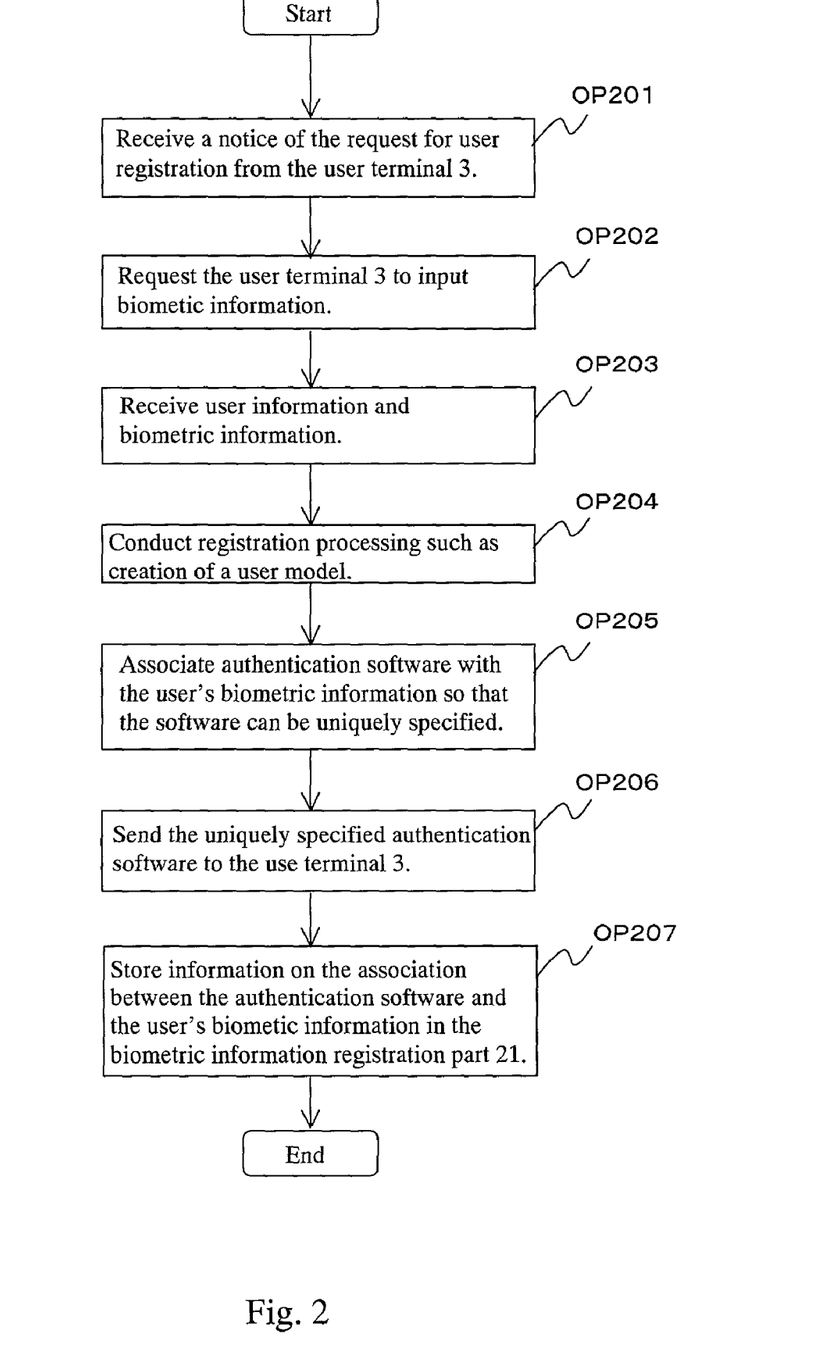
FIG. 2 is a flow chart showing an exemplary flow of processing in a registration phase of user information and user's biometric information in the user authentication system of Embodiment 1 according to the present invention.

Next, an exemplary flow of processing in a registration phase of user information and user's biometric information, mainly in the authentication server 2, will be described with reference to a flow chart in FIG. 2.

First, the authentication server 2 is notified of a request for user registration from the user terminal 3 (Operation 201). A user accesses the authentication server 2 through the user terminal 3, thereby notifying the authentication server 2 that the user requests user registration. The authentication server 2 that receives a notice of the request for user registration registers the user information in the user information management part 22.

The authentication server 2 requests the user terminal 3 to input biometric information of a user, such as natural voice data, a fingerprint image, a face picture, and an iris image (Operation 202). The user inputs his/her biometric information using the biometric input part 32 equipped in the user terminal 3, and sends it to the authentication server 2.

The authentication server 2 receives the user information and biometric information sent from the user terminal 3 (Operation 203). Based on the received biometric information, the biometric information registration part 21 creates a user model and registers it (Operation 204). The user information is stored in the user information management part 22.

The authentication software transmission part 23 confirms that a user model is created and biometric information is normally registered by the biometric information registration part 21. Thereafter, the authentication software transmission part 23 associates authentication software with the user's biometric information so that the authentication software can be uniquely specified (Operation 205). In order to uniquely specify the authentication software, in addition to association of authentication software with biometric information, an index can be embedded in the authentication software. Alternatively, a user's personal ID can be embedded in the authentication software. In the case where an index is embedded in authentication software, a user terminal ID is fixed, so that there is the following advantage. When there is unauthorized use of a user terminal due to the robbery and the like, access from authentication software provided with an index in the stolen user terminal can be rejected. Furthermore, in the case where a personal ID is embedded in the authentication software, a registrant who can access the authentication server 2 by using the authentication software is limited. Therefore, a registrant is prevented from pretending to be another registrant, and a user is not required to input a personal ID when using the authentication software.

After uniquely specifying authentication software at Operation 205, the authentication software transmission part 23 sends it to the user terminal 3 (Operation 206). Furthermore, information on the association between the authentication software generated at Operation 205 and the user's biometric information is stored in the biometric information registration part 21 (Operation 207). The order of Operations 206 and 207 may be reversed.

The user terminal 3 receives the authentication software from the authentication server 2, and downloads it to the memory 33.

As described above, each user terminal 3 downloads authentication software that can be uniquely specified to the memory 3, so that the authentication server 2 can uniquely specify each user terminal 3. This provides the same effect as that obtained by assigning a terminal ID to each user terminal 3. Furthermore, since the authentication software is associated with user's biometric information, the authentication server 2 has information on association among a user terminal, authentication software, and user's biometric information.

As is understood from the above-described flow of the user registration processing, the authentication software required for using the authentication server 2 cannot be obtained without registering biometric information. More specifically, the user terminal 4 that is connected on the network 1 but does not register biometric information has no authentication software. Therefore, A user of the user terminal 4 cannot pretend to be another user with respect to the authentication server 2. Because of this, a user of any terminal connected on the network 1 can be prevented from pretending to be another user.

An exemplary flow of processing in the registration phase of user information and user's biometric information has been described above.

Figure 3:
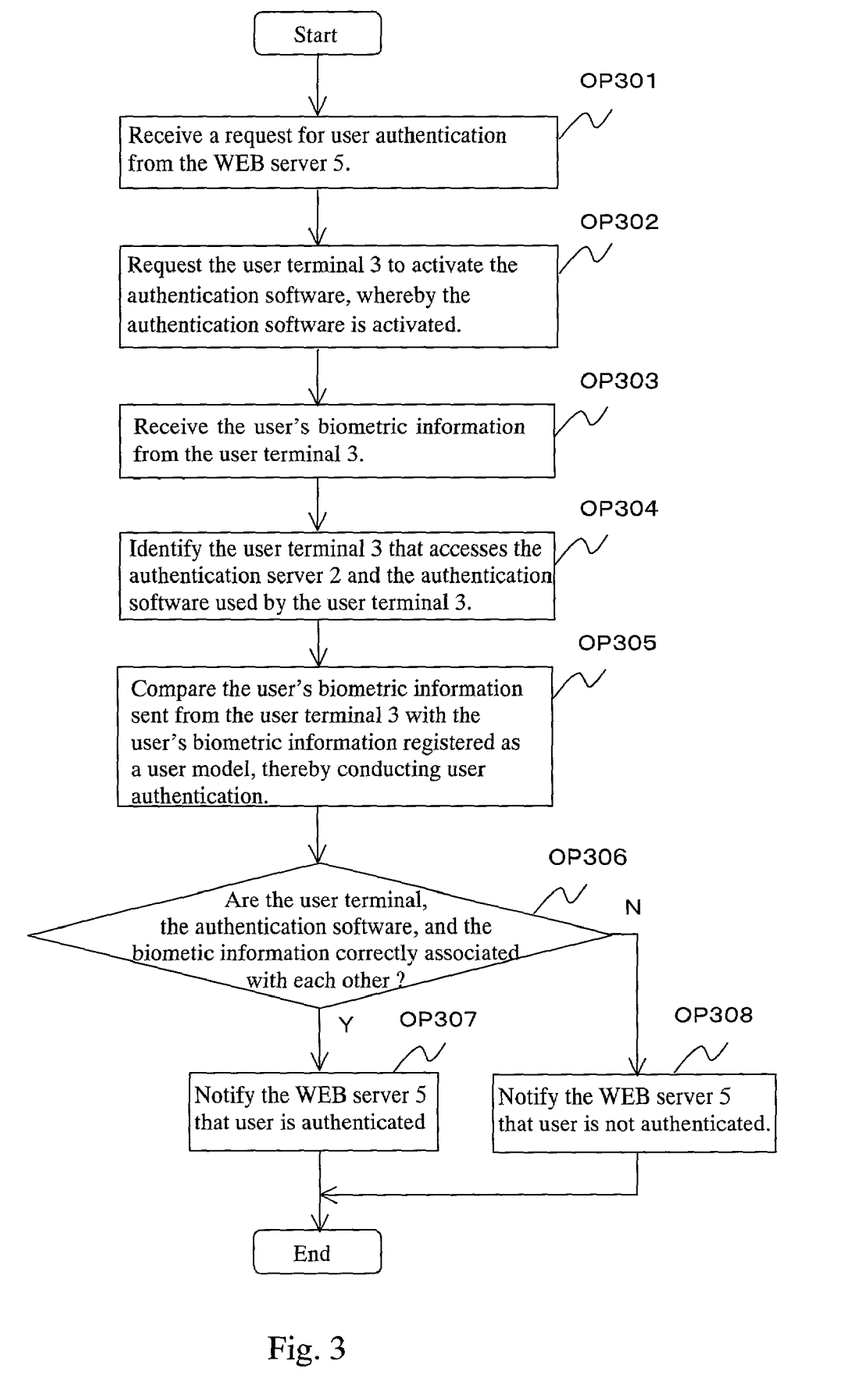
FIG. 3 is a flow chart showing an exemplary flow of processing in the user authentication phase.

Next, an exemplary flow of processing in a user authentication phase, mainly in the authentication server 2, will be described with reference to a flow chart shown in FIG. 3.

The WEB server 5 that receives an access request from the user terminal 3 requests the user terminal 3 to access the authentication server 2 and obtain user authentication. The authentication server 2 receives a request for user authentication for the user terminal 3 from the WEB server 5 (Operation 301).

The authentication server 2 requests the user terminal 3 to activate the authentication software stored in the memory 33, whereby the authentication software is activated (Operation 302). In the case of a system for requesting an input of a password when the authentication software is used, the user terminal 3 is requested to input a password. The user inputs a password specified by the authentication server 2 and enters a session of authentication.

When the user enters the authentication session, the authentication software requests the user to input biometric information, and sends the inputted biometric information to the authentication server 2 together with an index or a personal ID embedded in the authentication software. The authentication server 2 receives the user's biometric information through the biometric information input part 32 at the user terminal 3 (Operation 303).

The authentication processing part 25 at the authentication server 2 checks the biometric information sent from the user terminal 3, and identifies the user terminal 3 that accesses the authentication server 2 and the authentication software used by the user terminal 3 (Operation 304).

The authentication processing part 25 compares the user's biometric information sent from the user terminal 3 with the user's biometric information associated with the authentication software and registered as a user model in the biometric information registration part 21, thereby conducting user authentication (Operation 305).

When the user terminal, the authentication software, and the biometric information are correctly associated with each other (Operation 306: Y), the authentication processing part 25 authenticates a user, and the WEB server 5 is notified that the user is authenticated (Operation 307). On the other hand, when the user terminal, the authentication software, and the biometric information are not correctly associated with each other (Operation 306: N), the authentication processing part 25 rejects user authentication, and the WEB server 5 is notified that the user is not authenticated (Operation 308).

Thus, the WEB server 5 is notified of the results of authentication. In the case where the user of interest is authenticated, the WEB server 5 permits the user to use service which the WEB server 5 provides.

Because of the above-mentioned flow of the user authentication processing, high security can be ensured. Therefore, a user who accesses the authentication server 2 so as to receive user authentication without registering biometric information cannot be authenticated. Furthermore, in the case where a user who is authenticated and conducts some fraud when using an application, since biometric information of a user who has downloaded authentication software is stored in the authentication server 2, the biometric information can be used for tracking down an unauthorized user. Thus, there is also an effect of preventing an authenticated user from conducting fraud.

In the authentication software management part 24, a personal ID and a password can be specified in software to be downloaded, or only a password can be specified therein. Furthermore, a user may determine a password as an initial set value.

In the above-mentioned embodiment, the biometric information registration part 21 is placed in the authentication server 2. However, it may be placed at another terminal connected on the network 1.

The network 1 may be connected through the Internet, an intranet, or a telephone line.

In the case where a user desires to change a terminal to be used for authentication, the user only needs to copy or move the downloaded authentication software. Furthermore, even if authentication software is copied without proper authorization, the authentication software cannot be used without knowing a personal ID and a password.

The authentication software may be binary or an applet as long as it conducts processing for authentication, and a personal ID and a password in the software cannot be accessed or manipulated from a terminal side.

In the present embodiment, the authentication software is programmed so as to obtain biometric information, allow private information to be input, and send the information to the authentication server. However, it may also be possible that biometric information is obtained by another method, and the authentication software sends the biometric information thus obtained and the private information to the authentication server. Furthermore, in the case where private information for authentication is written in a dialog box of a browser on the WEB provided by the authentication server 2, the authentication software may have a function of only sending biometric information to the authentication server 2 or may have a function of obtaining and sending biometric information.

In the present embodiment, the WEB server 5 and the authentication server 2 are connected on the network 1. However, it may also be possible to provide service and conduct authentication processing on the WEB in the same server.

Embodiment 2

Figure 4:
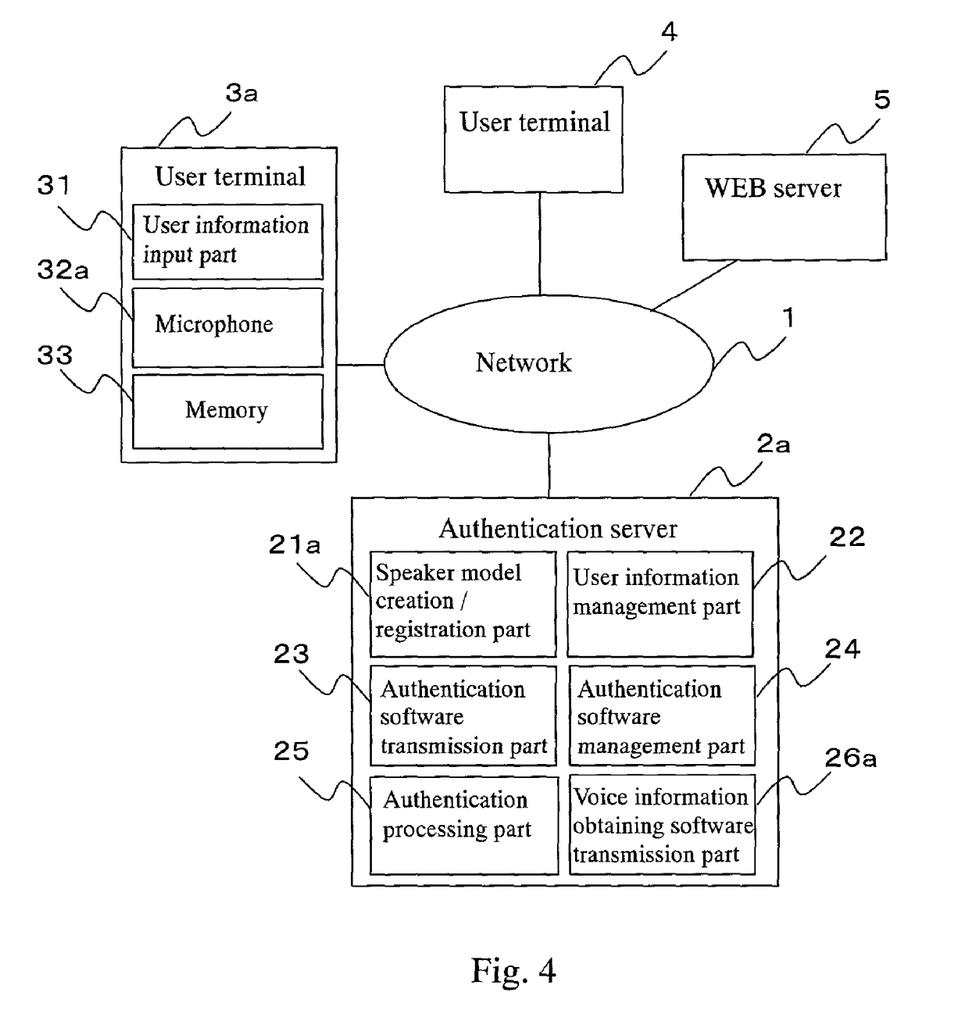
FIG. 4 illustrates an exemplary configuration of a user authentication system of Embodiment 2 according to the present invention.

FIG. 4 illustrates an exemplary configuration of a user authentication system of Embodiment 2 according to the present invention. In Embodiment 2, for the purpose of obtaining biometric information to be registered, software for registering biometric information is sent to a user terminal. In Embodiment 2, the case will be described where voice information is used as biometric information to be registered.

It is assumed that an authentication server 2*a*, a user terminal 3*a* that has conducted user registration using biometric information, and a user terminal 4 that has not conducted user registration using biometric information are connected to each other on a network 1. Furthermore, a WEB server 5 available to authenticated users is connected to the network 1. In order for a user to receive service on the WEB server 5 by using a browser of the user terminal 3, the user is required to register biometric information in the authentication server 2*a* to obtain user authentication.

The authentication server 2*a* includes a biometric information registration part 21, a user information management part 22, an authentication software transmission part 23, an authentication software management part 24, an authentication processing part 25, and a biometric information registration software transmission part. In the present example, as the biometric information registration software transmission part 26, voice information obtaining software transmission part 26*a* is used. As the biometric information registration part 21, a speaker model creation/registration part 21*a* is used.

The voice information obtaining software transmission part 26*a* sends biometric information registration software (herein, voice information obtaining software) for extracting biometric information for registration used for creating a user model. It is assumed that the biometric information registration software to be sent corresponds to authentication software to be sent to the user terminal 3*a*, and uses the same algorithm as that for extracting biometric information adopted by authentication software. It is preferable that the use conditions of the biometric information registration software are defined so as to be used only at a time of registration. More specifically, it is preferable that the biometric information registration software becomes unusable or is automatically deleted after a registration process.

The biometric information registration part 21 creates and registers a user model based on biometric information sent from a user through the biometric information registration software. In the present example, the speaker model creation/registration part 21*a* creates a speaker model of a user based on voice information sent from a user through the voice information obtaining software.

The user terminal 3*a* includes a user information input part 31, a microphone 32*a* that is a biometric information input part 32, and a memory 33. In Embodiment 2, the memory 33 is used not only for storing authentication software sent from the authentication server 21, but also for storing biometric information registration software.

Figure 5:
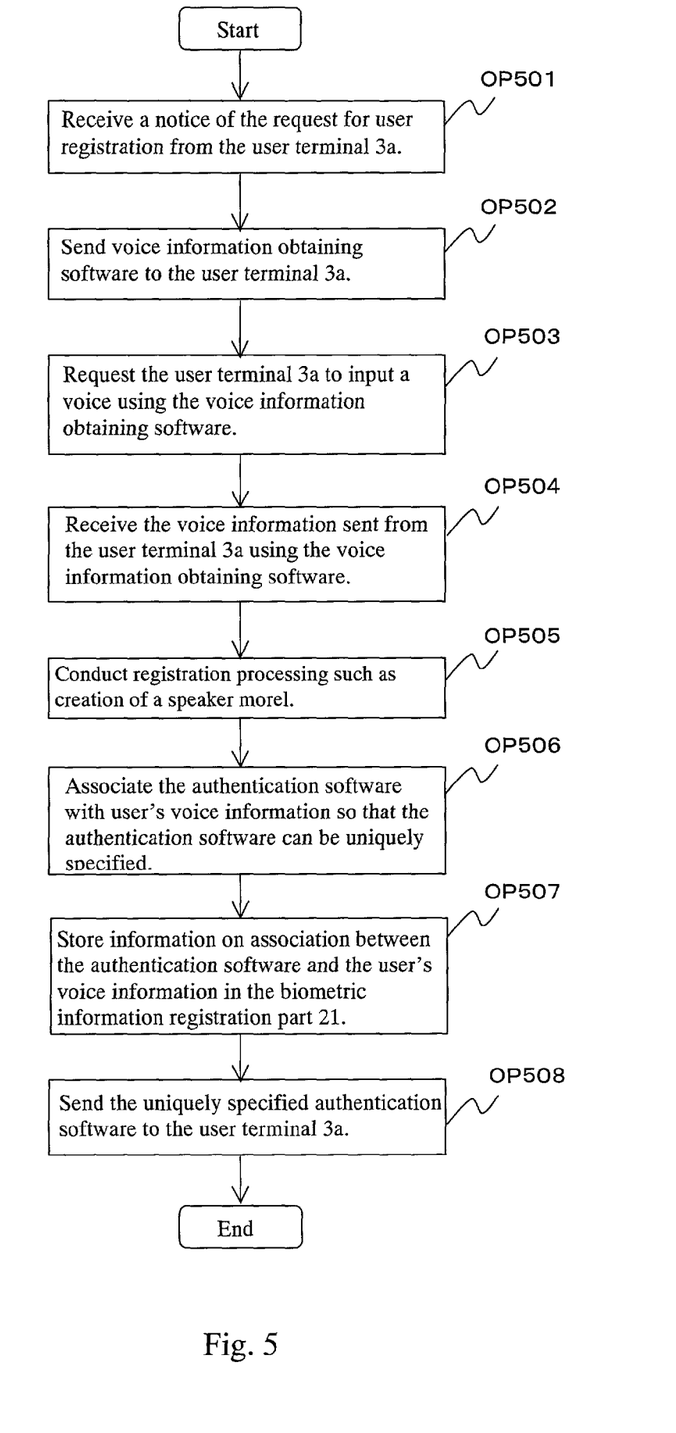
FIG. 5 is a flow chart showing an exemplary flow of processing in a registration phase of user information and user's biometric information in the user authentication system of Embodiment 2 according to the present invention.

An exemplary flow of processing in a registration phase of user information and user's biometric information, mainly in the authentication server 2*a*, in the user authentication system of Embodiment 2 will be described with reference to a flow chart in FIG. 5.

First, the authentication server 2*a* is notified of a request for user registration from the user terminal 3*a* (Operation 501). A user accesses the authentication server 2*a* through the user terminal 3*a*, thereby notifying the authentication server 2*a* that the user requests user registration. The authentication server 2*a* that receives a notice of the request for user registration registers the user information sent from the user terminal 3*a* in the user information management part 22.

The authentication server 2a sends biometric information obtaining software to the user terminal 3a. In the present example, voice information is used as biometric information, so that voice information obtaining software is sent to the user terminal 3a (Operation 502). The voice information obtaining software is downloaded from the voice information obtaining software transmission part 26a to the user terminal 3a by using an FTP technique or the like. The user terminal 3a stores the downloaded voice information obtaining software in the memory 33. Alternatively, the following may also be possible. Upon receiving a request for sending biometric information obtaining software, all kinds of biometric information obtaining software prepared in the authentication server 2a are sent to the user terminal 3a, and the user selects software corresponding to biometric information which the user desires to register, thereby registering the biometric information.

The authentication server 2a requests the user terminal 3a to input a voice that is user's biometric information using the voice information obtaining software (Operation 503).

The user executes the downloaded voice information obtaining software, and inputs a voice through the microphone 32a. The voice information obtaining software extracts required voice information of the voice obtained through the microphone 32a to send it to the authentication server 2a. The authentication server 2a receives the voice information sent from the user terminal 3a using the voice information obtaining software (Operation 504).

The speaker model creation/registration part 21a of the authentication server 2a creates a speaker model (user model) using the received voice information, and stores the speaker model so that it is associated with the user information registered in the user information management part 22 (Operation 505). The speaker model creation/registration part 21a converts the voice information into feature parameters, if required, thereby creating a speaker model. If there is enough storage capacity, feature parameters of the received user's voice may be stored together.

After confirming that the speaker model is created and biometric information is normally registered by the speaker model creation/registration part 21a, the authentication software transmission part 23 associates the authentication software with user's voice information so that the authentication software can be uniquely specified (Operation 506). The authentication software transmission part 23 embeds an index and a user's personal ID in the authentication software stored in the authentication software management part 24, and fixes a password therein.

The authentication software transmission part 23 sends the authentication software thus obtained to the user terminal 3a (Operation 507).

Furthermore, the information on association between the authentication software generated at Operation 505 and the user's biometric information is stored in the speaker model creation/registration part 21a (Operation 508). The order of Operations 507 and 508 may be reversed.

The user terminal 3a stores the received authentication software in the memory 33.

As described above, in Embodiment 2, since the biometric information registration software is sent to the user terminal 3a for the purpose of obtaining biometric information to be registered, the user terminal 3a does not need to have software for extracting/obtaining biometric information.

In the above-mentioned exemplary processing, the speaker model creation/registration part 21a extracts feature parameters from user's voice information. However, the following configuration may also be possible. The biometric information registration software extracts feature parameters from user's voice information, and the speaker model creation/registration part 21a uses the feature parameters.

In the processing of the user authentication phase, voice information is used as biometric information. However, the processing flow thereof is similar to that in Embodiment 1. Therefore, the description thereof will be omitted here.

A sampled voice signal can be used as the biometric information to be sent through the network 1. In this case, the sampled voice signal is sent to the authentication server, and converted into feature parameters on the authentication server side. In this case, a voice signal can be recorded in the speaker model creation/registration part 21a.

In Embodiment 2, the WEB server 5 and the authentication server 2a are connected on the network 1. However, it may also be possible to provide service and conduct authentication processing on the WEB in the same server.

Furthermore, in Embodiment 2, a user registers required private information in the authentication server 2a before the user terminal 3a receives the biometric information registration software. However, the following may also be possible. The user terminal 3a receives biometric information registration software. Biometric information is input and converted into feature parameters. Thereafter, required private information is attached to the data to be transmitted.

Embodiment 3

In Embodiment 3, a method for authenticating a user based on a face picture using a mobile station (MS) will be described.

Figure 6:
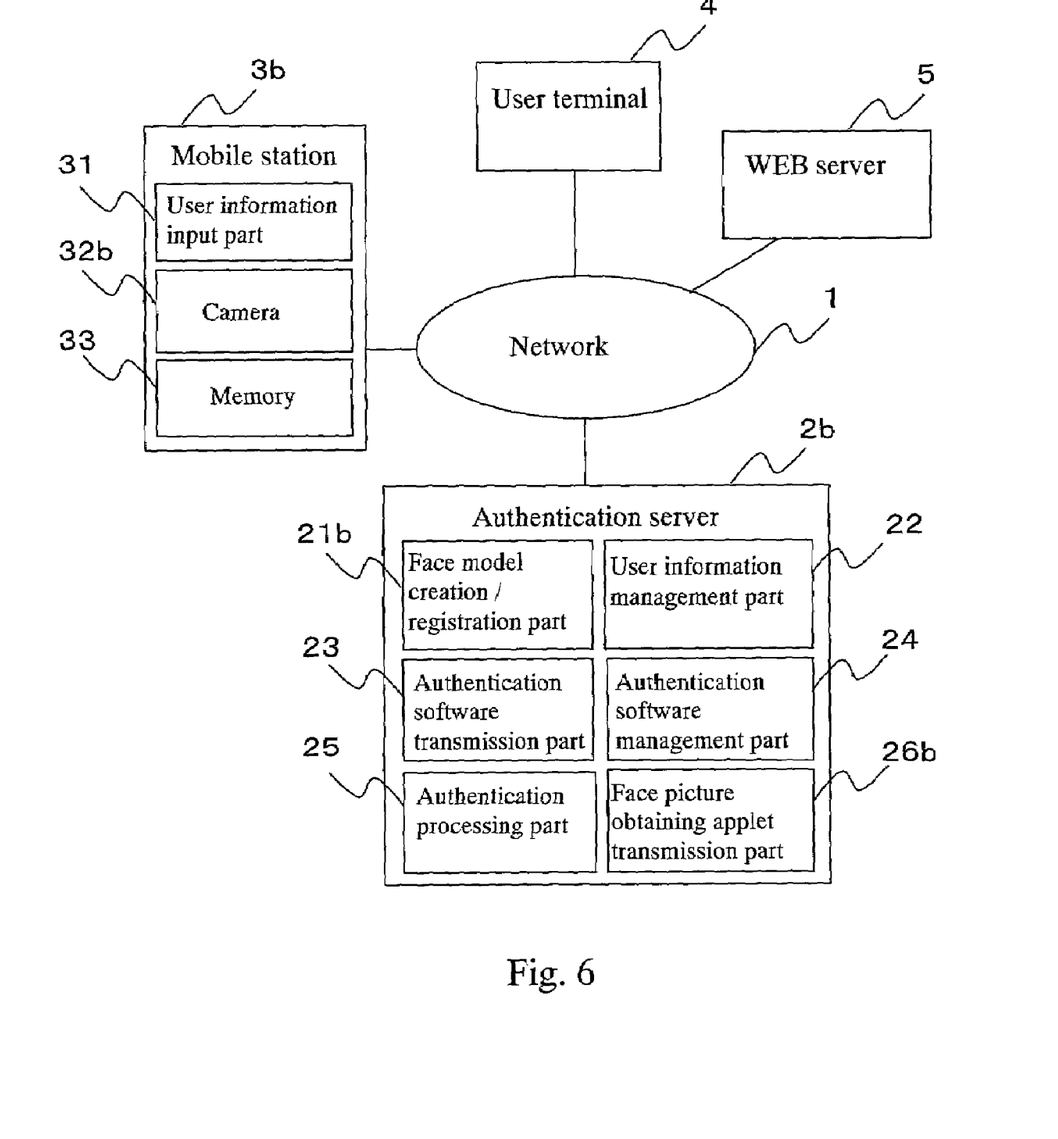
FIG. 6 illustrates an exemplary configuration of a user authentication system of Embodiment 3 according to the present invention.

FIG. 6 illustrates an exemplary configuration of a user authentication system of Embodiment 3 according to the present invention.

In Embodiment 3, a mobile station 3b is used as a user terminal 3. The mobile station 3b is equipped with a camera 32b as a biometric information input part 32. In an authentication server 2b, a face picture obtaining applet transmission part 26b is used as a biometric information registration software transmission part 26. A face model creation/registration part 21b is used as a biometric information registration part 21.

It is assumed that a user accesses a network 1 by communicating with a base transceiver station (BTS) using a browser in the mobile station 3b. It is also assumed that the user browses through the WEB in a WEB server 5 on the network 1, and recognizes that it is required to register a face picture (biometric information) in the authentication server 2b and receive personal identification in order to receive service. The user accesses the authentication server 2b through the network 1, and downloads a face picture obtaining applet. Upon receiving a request of a face picture obtaining applet, the authentication server 2b sends a face picture obtaining applet from the face picture obtaining applet transmission part 26b. The applet is programmed with a series of procedures so as to capture a face picture, input private information, and send the private information to the authentication server 2b. The user executes the downloaded applet in the mobile station 3b, thereby inputting required private information, capturing a face picture using the camera 32b equipped in the mobile station 3b, and sending data of the face picture and the private information to the authentication server 2b.

In the authentication server 2b, a face model is created in the face model creation/registration part 21b based on the face picture sent from the user station 3b. The face model is associated with the private information to be stored. If there is enough storage capacity, the face picture is stored.

When the face model is stored and registered in the face model creation/registration part 21*b*, the authentication software transmission part 23 of the authentication server 2*b* embeds an index and a personal ID, and provides a password in authentication software stored in the authentication software management part 24. Thereafter, the authentication software is sent to the user's mobile station 3*b*. The authentication software is stored in a memory 33 in the mobile station 3*b*.

When the user makes a request for receiving service of the WEB server 5 by using the browser in the mobile station 3*b*, the WEB server 5 makes a request of the authentication server 2*b* for user authentication. The WEB server 5 accesses the authentication server 2*b* to request the user to receive user authentication using the authentication software.

The user who has received a request from the WEB server 5 activates the authentication software stored in the mobile station 3*b*. After inputting a password required for execution, the user captures a face picture using the camera 32*b*, and sends it to the authentication server 2*b*. The authentication software is programmed so that information of a registrant who is attempting to obtain authentication is attached to a face picture to be sent. The authentication server 2*b* receives the face picture and the user information, and takes a face model of the corresponding registrant from the face model creation/registration part 21*b*. The authentication processing part 25 conducts user authentication, and sends authentication results to the WEB server 5.

The WEB server 5 determines whether or not service is available to the user based on the received authentication results.

In the above description, it is assumed that the user terminal 3*a* is a personal computer in Embodiments 1 and 2, and the user terminal 3*b* is a mobile station in Embodiment 3. However, the present invention is not limited thereto.

Embodiment 4

In Embodiment 4, the case of using a plurality of kinds of biometric information will be described.

Figure 7:
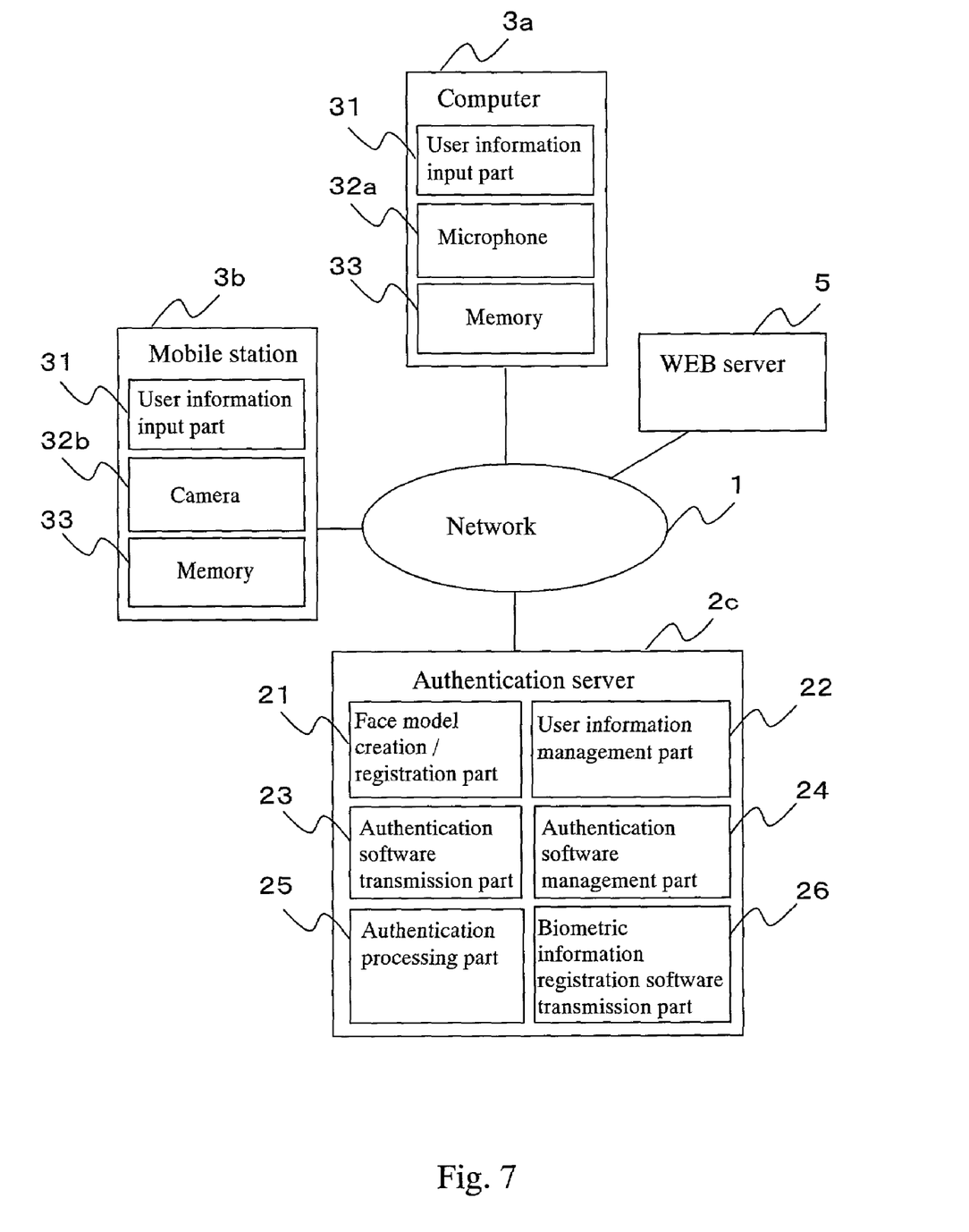
FIG. 7 illustrates an exemplary configuration of a user authentication system of Embodiment 4 according to the present invention.

An authentication software transmission part 23 of an authentication server 2*c* sends authentication software provided with an extraction algorithm corresponding to one or a plurality of kinds of biometric information used in the registration phase of the user to a user terminal of interest. A user can selectively input corresponding biometric information using the authentication software upon receiving a request for user authentication. Thus, the authentication software transmission part 23 limits access using biometric information other than the registered biometric information.

FIG. 7 illustrates an exemplary configuration of a user authentication system of Embodiment 4 according to the present invention. In the same way as in Embodiment 3, a mobile station is used as a user terminal. A mobile station 3*b* is equipped with a camera 32*b*, and a personal computer 3*a* is used for inputting biometric information through a microphone 32*a*. The processing in a registration phase of biometric information is similar to that in Embodiments 1 to 3 as described above. In Embodiment 4, when biometric information is selectively registered, biometric information used in a user authentication phase must be selected.

In an authentication server 2*c*, a plurality of kinds of authentication software are stored/managed so as to correspond to biometric information used in an authentication software management part 24.

In the present example, the authentication server 2*c* receives a request for biometric information registration software from the mobile station 3*b* and the personal computer 3*a*. The authentication server 2*c* allows the mobile station 3*b* to download a face picture registration applet, and allows the personal computer 3*a* to download a voice information registration applet, whereby biometric information is registered.

When registration of biometric information is completed in accordance with each aspect, the mobile station 3*b* is allowed to download a face picture authentication applet, and the personal computer 3*a* is allowed to download a voice authentication applet.

The mobile station 3*b* and the personal computer 3*a* conduct user authentication using respective authentication applets.

Even if a user loses the mobile station 3*b*, and an unauthorized user attempts to use the mobile station 3*b*, it is not uniquely determined whether or not a voice should be input through the microphone (that is usually equipped in a telephone) of the mobile station 3*b* or a face picture should be input through the camera 32*b* of the mobile station 3*b* as biometric information. Therefore, security is ensured.

Furthermore, if a user desires to change the selected biometric information or add another biometric information, the user can change/add biometric information to be registered. For example, in the case where the user of the mobile station 3*b* desires to receive user authentication based on a voice, in addition to user authentication based on an image, so as to improve security, the user of the mobile station 3*b* can also register biometric information of a voice in the authentication server 2*c*. The authentication server 2*c* allows the mobile station 3*b* to download a voice authentication applet, thereby allowing user authentication utilizing biometric information of a voice to be conducted.

In the above example, the applets for registering biometric information of a face picture and a voice are selected by the user terminal 3 and sent by the authentication server 2. However, the authentication server 2 may select them.

Embodiment 5

In Embodiment 5, software for analyzing biometric information such as authentication software and biometric information registration software is allowed to have variations in conditions for analyzing biometric information and model configuration methods.

Conditions for analyzing biometric information or user models are varied or a plurality of kinds of analysis conditions are assigned on the user terminal basis. Thus, a possibility of accepting a registrant who pretends to be another registrant by using authentication software can be decreased.

User authentication using a voice as biometric information will be exemplified.

Figure 8:
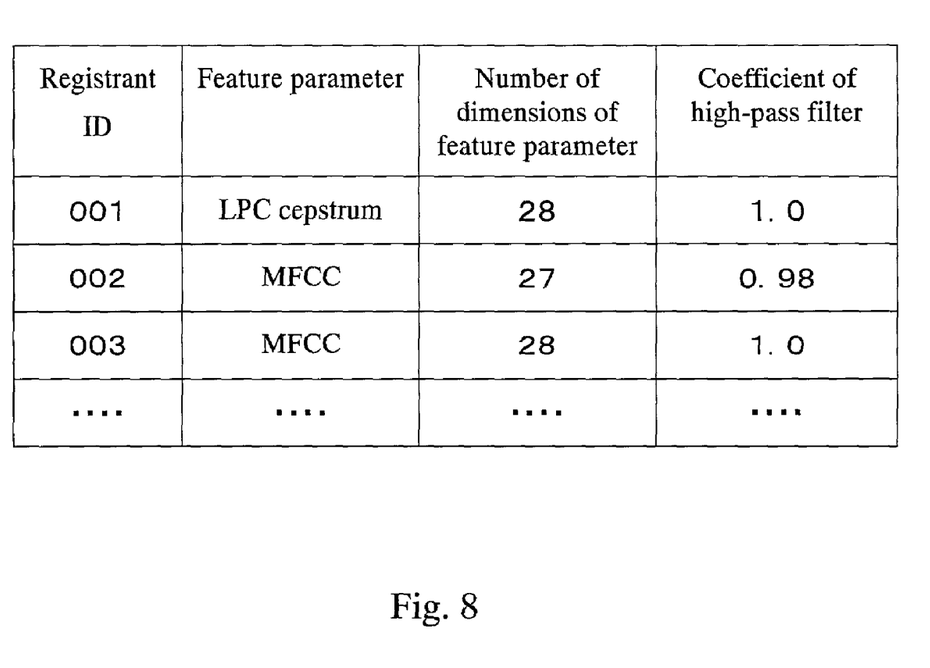
FIG. 8 is a diagram illustrating the difference and kinds of the conditions for analyzing voice information and the model configuration methods used in authentication software and voice information registration software.

FIG. 8 is a diagram illustrating the difference and kinds of the conditions for analyzing voice information and the model configuration methods used in authentication software and voice information registration software. In the present example, an analysis method (Linear Predictive Coding (LPC), Cepstrum, or Mel Frequency Cepstral Coefficient (MFCC)), number of dimensions of feature parameters, and a coefficient of a high-pass filter are varied on the user terminal basis.

As described above, by allowing number of dimensions of feature parameters and a coefficient of a high-pass filter to have variations, a rejection possibility of user authentication due to mismatching of analysis conditions is improved when a registrant pretends to be another registrant, and security is ensured.

Embodiment 6

Figure 9:
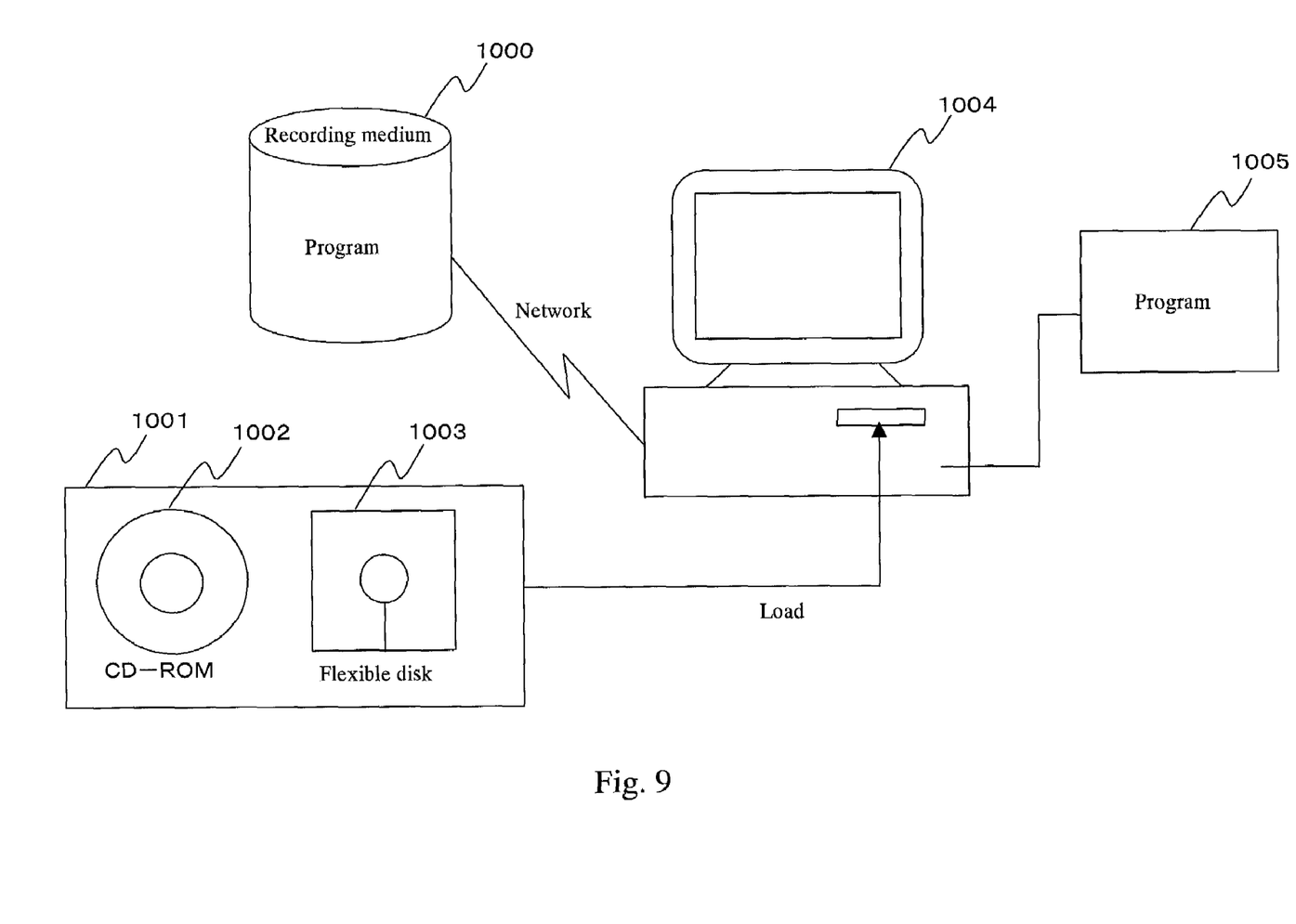
FIG. 9 illustrates exemplary recording media storing a processing program for realizing a user interface system of Embodiment 5 according to the present invention.

A user authentication system of the present invention can be configured using various kinds of computers by recording a program describing processing operations for realizing the above-mentioned configuration in a computer-readable recording medium. Examples of a recording medium storing a program describing processing operations for realizing a user interface system of the present invention include not only a portable recording medium 1001 such as a CD-ROM 1002 and a flexible disk 1003, but also a recording medium 1000 in a recording apparatus on a network and a recording medium 1005 such as a hard disk and a RAM of a computer, as shown in FIG. 9. In execution, the program is loaded onto a computer 1004, and executed on a main memory.

As described above, according to the user authentication system, authentication software is distributed only to those who have registered biometric information. Therefore, unauthorized terminals on the network can be prevented from accessing an authentication server. Furthermore, even in order for a registrant to pretend to be another registrant, it is required to obtain authentication software. In this case, the registrant pretending to be another registrant can be tracked down by using biometric information registered in the authentication server.

By setting a personal ID and a password for using authentication software, even if authentication software is copied without proper authorization, and a terminal is stolen, authentication software cannot be used easily. Even if someone succeeds in using the stolen authentication software, it is not easy to pretend to be a user as long as authentication is confirmed using biometric information.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A user authentication system for conducting user authentication by using a user's biometric information, comprising: a user terminal and an authentication server connected to each other on a network, the authentication server comprising
a biometric information registration part for obtaining the user's biometric information from the user terminal and registering the user's biometric information,
a processing part allowing authentication software associated with the biometric information to have identification information capable of uniquely specifying the user or the user terminal requesting authentication, the authentication software allowing the user terminal to notify the user of a request for the user's input of biometric information and to send the inputted biometric information to the authentication server,
an authentication software transmission part for sending the authentication software to the user terminal after the user has completed registration of biometric information to the biometric information registration part, and
an authentication processing part for conducting user authentication upon receiving a request for user authentication by receiving the user's biometric information sent from the user terminal and the identification information of the authentication software, and obtaining a biometric information corresponding to the received identification information from the biometric information registration part, and comparing the biometric information corresponding to the received identification with the received biometric information; and the user terminal comprising
a receiving part for receiving the authentication software sent from the authentication server,
a memory for storing the received authentication software,
a device for notifying the user of a request for the user's input of biometric information under a control of the authentication software stored in the memory,
an input part for obtaining the biometric information inputted by the user, and
a transmission part for sending an authentication request containing the biometric information inputted through the input part and the identification information of the authentication software to the authentication server under a control of the authentication software stored in the memory.

2. A user authentication system according to claim 1, further comprising a biometric information registration software transmission part for obtaining the user's biometric information to be registered in the biometric information registration part upon receiving a request for registration from the user.

3. A user authentication system according to claim 1, wherein analysis conditions for extracting biometric information of the authentication software are varied depending upon the user, whereby the analysis conditions of the authentication software are allowed to have variations among user terminals.

4. A user authentication system according to claim 1, wherein an index is embedded as the identification information in the authentication software, whereby a terminal ID of each user terminal is fixed to be managed.

5. A user authentication system according to claim 1, wherein a personal ID is embedded as the identification information in the authentication software, whereby the user authenticated by using the authentication software is limited.

6. A user authentication system according to claim 1, wherein a password is provided to the authentication software, and the authentication software only accepts access from a user who inputs the provided password.

7. A user authentication system according to claim 1, wherein one kind or a plurality of kinds of biometric information are registered in the biometric information registration part, and
the authentication software transmission part sends authentication software provided with extraction algorithms corresponding to the one kind or plurality of kinds of biometric information registered on a user basis to the user terminal.

8. A user authentication system according to claim 1, wherein the biometric information registration part receives additional registration of biometric information other than that registered therein, and
the authentication software transmission part sends authentication software provided with an extraction algorithm corresponding to the additionally registered biometric information to the user terminal.

9. A user authentication method for authenticating a user by using the user's biometric information between a user terminal and an authentication server connected to each other on a network, comprising:

obtaining and registering the user's biometric information with the authentication server through the user terminal;

processing authentication software using the authentication server after registration of the biometric information has been completed, the authentication software being associated with the biometric information and allowing the user terminal to notify the user of a request for the user's input of biometric information and to send the inputted biometric information to the authentication server, so that the authentication software has identification information capable of uniquely specifying the user or the user terminal requesting authentication and sending the authentication software to the user's terminal;

notifying the user of a request for the user's input of biometric information under a control of the authentication software using the user terminal;

obtaining the biometric information inputted by the user using the user terminal;

sending an authentication request containing the inputted biometric information and the identification information of the authentication software under a control of the authentication software using the user terminal; and conducting user authentication using the authentication server upon receiving a request for user authentication by receiving the user's biometric information sent from the user terminal and the identification information of the authentication software, and comparing the biometric information corresponding to the received identification information with the received biometric information.

10. A user authentication server connected to a user terminal on a network for authenticating a user by using the user's biometric information, comprising:

a biometric information registration part for obtaining the user's biometric information from the user terminal and registering the user's biometric information;

a processing part for allowing authentication software associated with the biometric information to have identification information capable of uniquely specifying the user or the user terminal requesting authentication, the authentication software allowing the user terminal to notify the user of a request for the user's input of biometric information and to send the inputted biometric information to the authentication server;

an authentication software transmission part for sending the authentication software to the user terminal after the user has completed registration of biometric information to the biometric information registration part; and an authentication processing part for conducting user authentication upon receiving a request for user authentication by receiving the user's biometric information sent from the user terminal and the identification information of the authentication software, and obtaining biometric information corresponding to the received identification information from the biometric information registration part, and comparing the obtained biometric information corresponding to the received identification information with the received biometric information.

\* \* \* \* \*